United States Patent
Tempest et al.

[11] Patent Number: 6,024,493
[45] Date of Patent: Feb. 15, 2000

[54] AIR BEARING

[75] Inventors: Michael C Tempest, Dorset, United Kingdom; Florin Dimofte, Fair View Park, Ohio

[73] Assignee: Westwind Air Bearing Ltd, United Kingdom

[21] Appl. No.: 09/073,647

[22] Filed: May 6, 1998

[30] Foreign Application Priority Data

May 8, 1997 [GB] United Kingdom .................. 9709347

[51] Int. Cl.[7] ...................................................... F16C 32/06
[52] U.S. Cl. ............................................ 384/114; 384/115
[58] Field of Search ..................................... 384/100, 114, 384/115, 118, 120

[56] References Cited

U.S. PATENT DOCUMENTS

| | | | |
|---|---|---|---|
| 5,593,230 | 1/1997 | Tempest et al. | 384/100 |
| 5,628,567 | 5/1997 | Murabe et al. | 384/100 |
| 5,731,831 | 3/1998 | Murabe et al. | 384/115 X |
| 5,746,515 | 5/1998 | Takahashi et al. | 384/120 X |

*Primary Examiner*—Thomas R. Hannon
*Attorney, Agent, or Firm*—Nixon & Vanderhye PC

[57] ABSTRACT

An air bearing comprising a static shaft having a circumferential surface in a form which when developed into a substantially flat plane takes the form of a series of shallow sinusoidal waves having at least three wave peaks, wherein one of the peaks carries a groove extending longitudinally parallel to the shaft axis and which bearing further comprises a hollow support member mounted for rotation around the static shaft.

11 Claims, 1 Drawing Sheet

AIR BEARING

BACKGROUND OF THE INVENTION

1. Field of the Invention

This invention relates to air bearings and in particular to an improved aerodynamic bearing.

2. Description of the Related Art

We refer to European Patent Applications 0732516A and 0732517A in the names of Sumitomo and of Sumitomo jointly with Canon respectively.

The first of these defines a varying gap between stator and rotor where a mathematical relationship is disclosed for an enlarged gap over a 60° portion of the shaft. The second of these defines a gap formed by provision of flat faces along the peripheral surface of the shaft.

We also refer to publication WO94/28323 in which an air bearing is described and claimed comprising a plain cylindrical horizontal shaft rotatable in a non-circular bearing, wherein the developed form of the bearing surface into a substantially flat plane is a shallow sinusoidal wave having at least three wave peaks, the peak of one wave having a groove extending longitudinally of the bearing axis. In this arrangement the inner member rotates within an outer static member.

SUMMARY OF THE INVENTION

There have been recent requirements for the application of aerodynamic spindles which involve the spinning of polygons. The nature of aerodynamic bearings is that they need extreme levels of accuracy in alignment, and hence the prior art arrangement which involves taking a shaft with an optical element at its centre and mounting an aerodynamic bearing on each side of the optic presents problems. To overcome these problems we have considered location of the optic in an alternative configuration. If the shaft carrying the polygon is made hollow, then an internal static member can be mounted in such a way that the outer member rotates about the static member. The alignment of the two bearing surfaces is retained, as in the conventional form and the optic is located nominally between the two bearing surfaces.

Thus a main aim of the present invention is to provide an alternative layout where an improved aerodynamic air bearing performance can be achieved.

According to the present invention there is provided an air bearing comprising a static shaft having a circumferential surface in a form which when developed into a substantially flat plane takes the form of a series of shallow sinusoidal waves having at least three wave peaks, wherein one of the peaks carries a groove extending longitudinally parallel to the shaft axis and which bearing further comprises a hollow support member mounted for rotation around the static shaft.

Generally the hollow support member will be in the form of a right circular cylinder which faces said external cylindrical surface of the static shaft.

Preferably each wave-peak carries a groove extending longitudinally of the shaft parallel to the central axis.

Preferably the groove, or one of said grooves if there are more than one, is located at the lowermost point around the shaft, when the shaft is located other than vertically.

In another construction the shaft of the bearing may be arranged vertically with a magnetic means to control the axial position of the rotating element relative to the static element.

In general, the bearing axis can be arranged horizontally, vertically or at any angular position therebetween.

BRIEF DESCRIPTION OF THE DRAWINGS

An embodiment of an air bearing, according to the invention, will now be described by way of example only, with reference to the accompanying drawing in which.

DETAILED DESCRIPTION OF THE INVENTION

Figure 1:
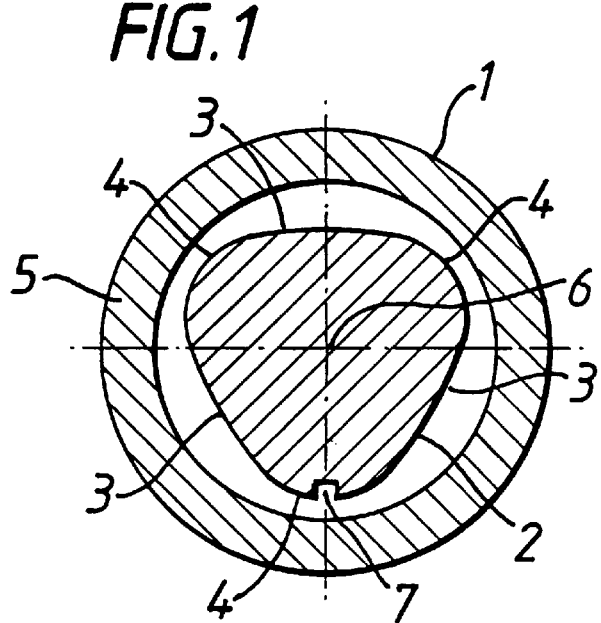
FIG. 1 shows a diagrammatic axial cross-section through the bearing.

The improved aerodynamic air bearing 1 comprises a static shaft 2 having a circumferential surface which when developed into a substantially flat plane takes the form of a series of shallow sinusoidal waves 3 having at least three wave peaks 4.

Located around shaft 2 is a hollow circular cylindrical member 5 for supporting other rotary components 5 which rotates about a central axis 6 of shaft 2. Its inner surface is a right circular cylinder which develops into a straight line, so as to develop an appropriate air bearing gap with respect to the static shaft.

The lower peak 4 has a groove 7 which extends longitudinally of the shaft 2 parallel to the central axis 6.

The improved aerodynamic bearing, according to the invention, eliminates half speed whirl instability within the operating speed range of speeds up to 80,000 rpm, compared with standard air lubricated bearings.

The bearing not only prevents the onset of half speed whirl, but also has the significant advantage of increasing the stiffness of the bearing when compared with conventional air bearings where the shaft and bearing are both cylindrical.

Due to the shaft 2 being static, the groove 7 is formed in the bottom peak, that is in the lowermost position around the shaft which ensures the pressure at the bottom of the shaft is maintained at atmospheric pressure. The groove also helps to discourage the formation of half-speed whirl within the bearing.

Location of the groove in the lowermost position also helps to ensure that build up of pressure at start-up at the top of the shaft is not inhibited, that is at the main load bearing position. This feature is not applicable of course where the shaft is vertical in that the shaft periphery then has no lowermost position, however it is particularly useful when the shaft is located horizontally, but is also applicable at varying slopes of location of the shaft.

The air bearing may be located in any angular position between horizontal and vertical. In the vertical position, magnetic means (not shown) can be used to control the axial position of the rotating element relative to the static element.

Typical dimensions for the shaft are that the diameter may be in the region of 0.4 to 1 inch and 0.875 inches is a particular example, although shafts up to 4 inches to 5 inches in diameter can on occasion be used. Generally for a 0.875 inch diameter shaft the shaft clearance, that is the radial clearance, may vary sinusoidally between a minimum of 0.0001 inches and a maximum of 0.0003 inches, while the groove may typically be 0.06 inches wide and 0.01 to 0.02 inches deep.

Figure 2:
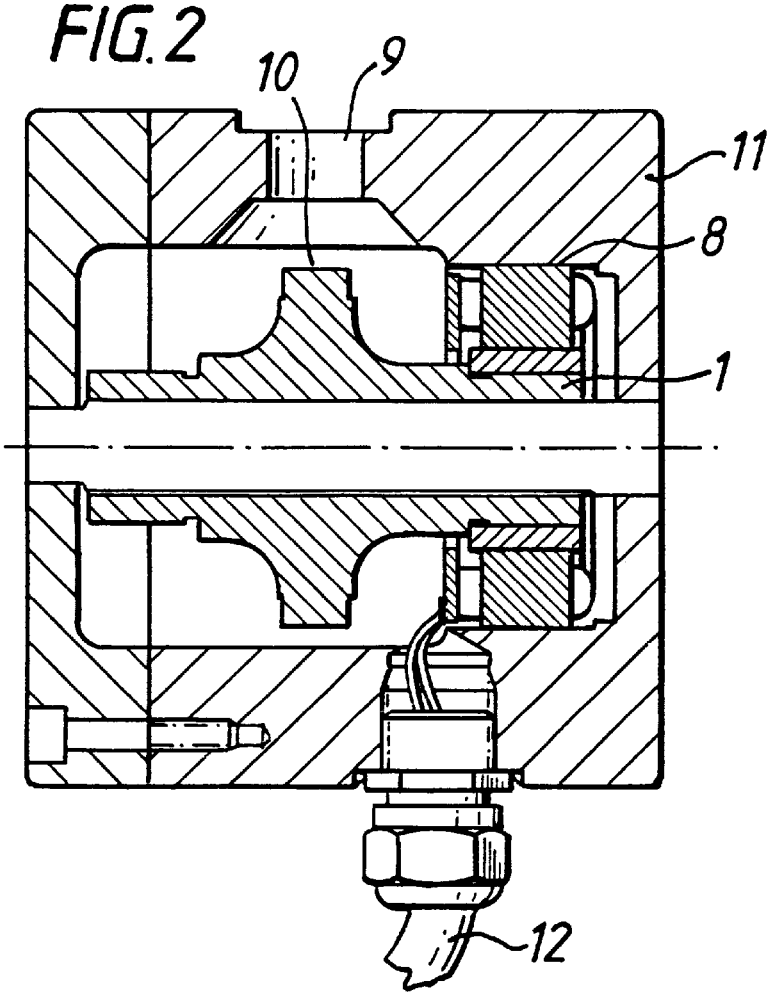
FIG. 2 shows a rotary polygon mirror device in cross-section.

Referring to FIG. 2, a rotary polygonal mirror device comprises a rotary hollow carrier 1 having a right cylindrical internal bearing as shown in FIG. 1 and arranged to be carried on a static shaft of the cross-section shown in FIG. 1 (not shown in FIG. 2). The rotary carrier 1 is driven by a high speed electric motor 8 and comprises a plurality (for example thirty two) of flat mirror surfaces 10 on its periphery. The whole assembly is enclosed within a housing 11 which incorporates supply cabling 12 for the motor and an aperture 9 for entry and exit of a laser beam directed on the rotating mirror surfaces 10.

It will be appreciated that the present invention has operational advantages over the arrangement shown in WO94/28323 since the non-circular component can be finished from outside rather than inside, and the load carrying bearing can be supported over its full length.

Various other modifications may be made within the scope of claims. The shaft may have a greater number of peaks than three, for example, five, and each of the wave peaks may have a groove extending longitudinally of the shaft parallel to the central axis.

We claim:

1. An air bearing comprising a static shaft having a circumferential surface in a form which when developed into a substantially flat plane takes the form of a series of shallow sinusoidal waves having at least three wave peaks, wherein at least one of the peaks carries a groove extending longitudinally, parallel to the shaft axis and further comprising a hollow support member mounted for rotation around the static shaft and having an internal circumferential bearing surface in a form which when developed into a substantially flat plane becomes a straight line, thereby developing by co-operation between said straight line and said peaks and at least one groove an air bearing gap that reduces the onset of half speed whirl at high rotational speeds.

2. An air bearing according to claim 1 in which said hollow support member has an internal surface in the form of a right circular cylinder which faces said external circumferential surface of the static shaft.

3. An air bearing as claimed in claim 1, wherein each wave peak carries a groove extending longitudinally parallel to the shaft axis.

4. An air bearing as claimed in claim 1, wherein said shaft is inclined to vertical and the groove is located at a lowermost position around the shaft.

5. An air bearing as claimed in claim 1 wherein the axis of the bearing is arranged with a magnetic means to control the axial position of the rotating element relative to the static element.

6. An air bearing according to claim 1 in combination with and carrying a rotary polygonal mirror device.

7. A rotary polygonal mirror device comprising a rotary hollow carrier having a right cylindrical internal bearing surface rotatably carried on a static shaft having a circumferential surface in a form which when developed into a substantial flat plane takes the form of a series of shallow sinusoidal waves having at least three wave peaks, at least one of said peaks having a groove defined in an external surface thereof and extending longitudinally, parallel to an axis of the static shaft, thereby defining by co-operation between said right cylindrical internal bearing surface and said peaks and groove an air bearing gap that reduces the onset of half speed whirl at high rotational speeds;

a high speed electric motor for driving said rotary carrier; and a plurality of flat mirror surfaces provided on an outer peripheral surface of said rotary hollow carrier.

8. The rotary polygonal mirror device of claim 7, further comprising a housing enclosing said rotary hollow carrier, and said rotor and having an aperture defined therein for entry and exit of a laser beam directed on said mirror surfaces.

9. The rotary polygonal mirror device of claim 7, wherein each wave peak has a groove defined therein and extending longitudinally, parallel to the axis of the static shaft.

10. The rotary polygonal mirror device of claim 7, wherein said shaft is inclined to vertical and the groove is located at a vertically lowermost position around the shaft.

11. The rotary polygonal mirror device of claim 7, wherein the axis of the bearing is arranged with a magnetic means to control the axial position of the rotating element relative to the static element.

* * * * *